United States Patent Office 3,584,071
Patented June 8, 1971

3,584,071
TELOMERIZATION OF ETHYLENE
John G. McNulty and William L. Walsh, Glenshaw, Pa., assignors to Gulf Research & Development Company, Pittsburgh, Pa.
No Drawing. Filed Mar. 1, 1968, Ser. No. 709,795
Int. Cl. C07c 3/10
U.S. Cl. 260—683.15
7 Claims

ABSTRACT OF THE DISCLOSURE

In the polymerization of ethylene to alpha olefins with a catalyst comprising triethylaluminum and nickel the presence of diphenyl ether is known to inhibit production of alpha olefins of chain length required for synthesis of biodegradable detergents. However, when ethylene is telomerized with a catalyst comprising alkyl aluminum sesquichloride and titanium tetrachloride the presence of diphenyl ether is shown to have an opposite effect whereby the production of alkyl groups of chain length required for synthesis of biodegradable detergents is increased.

---

In U.S. 3,035,105 it was shown that when ethylene is converted to higher alpha olefins with a catalyst comprising triethylaluminum and nickel the presence of diphenyl ether induces a shift in olefin product distribution at a constant reaction temperature causing the yield of $C_{12}$ olefins to be diminished by nearly three-fourths and the yield of $C_{10}$ olefins to be diminished by more than one-half while the yield of $C_8$ and lower olefins is greatly enhanced.

Because the synthesis of biodegradable detergents requires alpha olefins in the $C_{10}$ to $C_{18}$ range, generally, and specifically in the $C_{12}$ to $C_{16}$ range, the prior art indicates that the use of diphenyl ether is highly disadvantageous for an organometallic catalyzed ethylene polymerization process whose purpose in the production of an alpha-olefin product to be used in the preparation of detergents.

It has now been discovered that the use of an aromatic ether, such as diphenyl ether, with an ethylene polymerization catalyst comprising alkyl aluminum sequichloride and titanium tetrachloride unexpectedly affects the product distribution in a manner entirely contrary to that reported in the prior art wherein a trialkylaluminum-nickel catalyst was utilized. When the catalyst employed is alkyl aluminum sesquichloride and titanium tetrachloride so that ethylene groups grow between the aluminum and carbon atoms of the original alkyl groups to produce telomerized alkyl groups having between 2 and 40 carbon atoms, the use of diphenyl ether in the polymerization system sharply increases the production of $C_{10}$ and $C_{12}$ telomers, as contrasted to the substantial inhibition of these chain lengths reported in the prior art. While the use of diphenyl ether with the alkyl aluminum sesquichloride and titanium tetrachloride catalyst of this invention enhances the production of all components in the $C_{10}$ to $C_{18}$ range required for detergent production, it increases the production of $C_{10}$ and $C_{12}$ components most sharply and these are the very components whose yields were decreased the most according to the method of the prior art.

This invention will be illustrated by the following three examples. In all three examples ethylaluminum sesquichloride and titanium tetrachloride is the ethylene polymerization catalyst. In the first example no ether is employed. In the second example diphenyl ether is complexed with the ethylaluminum sesquichloride. In the third example diethyl ether is complexed with the ethylaluminum sesquichloride.

EXAMPLE 1

Ethylaluminum sesquichloride without ether $Et_{1.5}AlCl_{1.5}$ (168.0 grams) was charged to an $N_2$, flushed 1-liter, 3-necked flask equipped with a stirrer assembly, thermometer, gas inlet tube, and a Dry Ice condenser on the exit. The $Et_{1.5}AlCl_{1.5}$ was saturated with ethylene over a 30 minute period by passing 2.81 liters of ethylene into the reactor while raising the temperature from 29° C. to 90° C. Then 1.12 ml. of $TiCl_4$ were added to the reaction mixture and ethylene flow increased to maintain a positive pressure. The temperature was kept at 95–105° C. over the 8½ hour run during which time 9.76 moles of ethylene were consumed. A small sample was hydrolyzed with an $H_2SO_4$-$H_2O$ solution and the carbon number was determined by gas chromatography. The results are shown in the table.

EXAMPLE 2

Ethylaluminum sesquichloride-diphenyl ether $Et_{1.5}AlCl_{1.5}$ (175.4 grams) was charged to a nitrogen flushed 1-liter, 3-necked flask equipped with a stirrer assembly, thermometer, gas inlet tube and a Dry Ice condenser. Diphenyl ether (107.6 grams) was added to the flask and the temperature went up to 62° C. due to the heat of reaction between the diphenyl ether and the $$Et_{1.5}AlCl_{1.5}$$

The diphenyl ether-$Et_{1.5}AlCl_{1.5}$ complex was saturated with ethylene by passing ethylene gas through the reaction mixture for a period of about 3 hours. Then 19.5 ml. of $TiCl_4$ was added to the reaction mixture and rapid reaction with ethylene took place. The reaction was continued for 11 hours at 101–106° C. until 10.4 moles of ethylene had reacted. A small sample was hydrolyzed with a 50 percent water-HCl solution and the hydrocarbon distribution by carbon number was determined by gas chromatography. The results are shown in the table.

EXAMPLE 3

Ethylaluminum sesquichloride-diethyl ether $Et_{1.5}AlCl_{1.5}$ (89.4 grams) was charged along with an inert solvent (96.2 grams of heptane) to a nitrogen flushed 500 milliliter, 3-necked flask equipped with a stirrer assembly, thermometer, gas inlet tube and Dry Ice condenser. Diethyl ether (59.3 grams, 0.8 mole) was added to the flask and the temperature was kept at 28–31° C. by Dry Ice cooling which removed the heat caused by the reaction of diethyl ether and the $Et_{1.5}AlCl_{1.5}$. The diethyl ether-$Et_{1.5}AlCl_{1.5}$ complex was saturated with ethylene by passing ethylene gas through the reaction mixture for a period of about an hour. Then 0.68 ml. of $TiCl_4$ was added to the reaction mixture and the ethylene flow continued for 2½ hours at 93–98° C. with no indication of any reaction. A sample was taken from the reaction mixture and gas chromatograph analysis confirmed that no reaction had taken place. At this point and temperature of 98° C., 10 ml. of $TiCl_4$ was added to the reaction mixture. There was no sign of any reaction at this point.

The reaction was continued for about an hour at 98° C. At the end of this period a sample was taken and gas chromatograph analysis indicated that no reaction has taken place, as indicated in the following table.

|  | Ethylaluminum sesquichloride, mole percent | Ethylaluminum sesquichloride-diphenyl ether complex, mole percent | Ethylaluminum sesquichloride-diethyl ether complex |
|---|---|---|---|
| Example | 1 | 2 | 3 |
| $C_{10}$ | 11.6 | 15.8 | No product obtained. |
| $C_{12}$ | 14.2 | 18.2 | Do. |
| $C_{14}$ | 15.1 | 18.5 | Do. |
| $C_{16}$ | 14.2 | 15.5 | Do. |
| $C_{18}$ | 10.4 | 10.6 | Do. |
| Total | 65.5 | 78.6 |  |

The above table indicates the product hydrocarbon distribution for the three examples when the telomerized hydrocarbons are released from the ethylaluminum sesquichloride catalyst and shows that in the ether-free system the mole percent of $C_{12}$ to $C_{16}$ produced is only 43.5 while in the diphenyl ether complex system it is 52.2. The table also shows that the mole percent of $C_{10}$ to $C_{18}$ produced in the ether-free system is only 65.5 while in the diphenyl ether complex system it is 78.6.

The above table also indicates the use of diethyl ether completely inhibits the growth of ethylene on ethylaluminum sesquichloride. The reason evidently is that the bonding energy of the ether oxygen of a dialkyl ether with the ethylaluminum sesquichloride is so great that the telomerization of ethylene on the catalyst cannot proceed. On the other hand, the bonding energy of the ether oxygen of an aromatic ether is dissipated somewhat in an adjacent aryl group to give a looser complexing bond with the catalyst thereby permitting the reaction between ethylene and the ethylaluminum sesquichloride to proceed. Therefore, in the ethers of the present invention at least one of the groups attached to the ether radical must be an aryl group so that the ethers of this invention include diaryl ethers or monoaryl ethers. The aryl groups can be substituted with various substituents such as alkyl, alkoxy, or halogen groups. Examples of suitable ethers of this invention include monoethers such as diphenyl ether, methylphenyl ether, ethylphenyl ether, propylphenyl ether, butylphenyl ether, pentylphenyl ether, hexylphenyl ether, heptylphenyl ether, octylphenyl ether, benzylphenyl ether, nonylphenyl ether, decylphenyl ether, undecylphenyl ether, dodecylphenyl ether, tridecylphenyl ether, tetradecylphenyl ether, cyclopropylphenyl ether, cyclobutylphenyl ether, cyclopentylphenyl ether and cyclohexylphenyl ether.

The telomerization reaction proceeds at substantially atmospheric pressure and low temperatures. For example, the reaction can advantageously start at atmospheric pressure with a slight pressure build-up in the reactor to 20 p.s.i.g. Examples of reaction temperatures are 80 to 120° C. Because of the mildness of these conditions, titanium tetrachloride is required for the reaction to proceed. The amount of titanium tetrachloride is such that the molar ratio of Ti:Al is about 1/10 to 1/800, generally, and about 1/50 to 1/400, preferably. Although titanium tetrachloride is preferred, titanium trichloride can also be employed.

The temperatures, pressures and residence times for carrying out the reaction of the present invention are conventional and include temperatures between 40° C. and 150° C. generally, and preferably 50° C. to 120° C. The temperature must not be high enough to break the catalyst complex. At temperatures significantly above the temperature range of this invention the relatively weakly bound aryl ether complex will break down. It is a particular advantage of this invention that the reaction proceeds at temperatures below the decomposition point of the loosely bound aryl ether complex. Reaction pressures can range between 0 and 1000 p.s.i.g., generally, and between 0 and 200 p.s.i.g., preferably. Suitable reaction times are 1 to 40 hours, generally, and 1 to 10 hours, preferably.

The organo aluminum telomers produced can be trans-alkylated in a known manner with ethylene in a separate step to produce alpha olefins, hydrolyzed in a known manner to obtain paraffins or oxidized in a known manner and then hydrolyzed to obtain alcohols. To obtain paraffins the organo aluminum telomer is hydrolyzed with at least about 3 gram moles of water, in the presence, preferably, of a catalyst such as dilute hydrochloric acid, per gram atom of aluminum. An aqueous phase containing the aluminum hydroxy chloride and an organic phase containing mixed paraffins are obtained. To prepare the alcohol from the organo aluminum telomers they are first oxidized at a temperature of about 30° to about 100° C. and a pressure from about atmospheric to about 500 pounds per square inch gauge for about 15 to about 60 minutes. About one mole of oxygen for each two moles of alkyl groups to be oxidized is sufficient. The aluminum alkoxy chloride obtained is then hydrolyzed in the manner described above. An alcohol and an aluminum hydroxy chloride are obtained.

The alkyl aluminum sesquichloride component of the catalyst of this invention is conventional and is an admixture of a dialkyl aluminum chloride, $R_2$—Al—Cl, and an alkyl aluminum dichloride, R—Al—$Cl_2$, in which R represents the same or different normal or iso hydrocarbon radicals of short chain length, such as ethyl, propyl, butyl, hexyl, octyl, and the like. These mixed alkyl aluminum chlorides are commonly represented by the empirical formula $$R_x\text{—Al—}Cl_y \qquad (1)$$

in which R has the same significance as above indicated, and $x$ and $y$ are numbers whose sum totals three. When $x$ and $y$ are equal, the empirical formula is written $$R_{1.5}\text{—Al—}Cl_{1.5} \qquad (2)$$

which is known as alkyl aluminum sesquichloride.

In commercial operations, the values of the subscripts may vary somewhat from the 1.5 values, but the sum is always three and the deviation in subscript values is not great, rarely varying as widely as from about 1.2 to 1.8, and such mixed alkyl aluminum chlorides are commonly known as an alkyl aluminum sesquichloride, which term is used herein with that broader meaning.

The mixed alkyl aluminum chlorides may be made by any of the several known methods. Thus, the admixture of a compound of the formula $$R_m\text{—Al—}X_n \qquad (3)$$

wherein R has the same significance as in Formula 1 above, X represents hydrogen or chlorine, and $m$ and $n$ are numbers whose sum totals three and of which $n$, but not $m$ may be zero, with a second different compound of the formula $$Y_h\text{—Al—}Cl_k \qquad (4)$$

wherein Y is hydrogen or an alkyl radical of the scope of R above defined, $h$ and $k$ are numbers whose sum totals three and of which $h$, but not $k$, may be zero. Thus, an admixture of a compound of Formula 3 with a different compound of Formula 4 will produce the mixed alkyl aluminum chlorides.

Illustrative of the compounds within the Formula 3 above, where X is chlorine, are $$R_3\text{—Al, } R_2\text{—Al—Cl, } R\text{—Al—}Cl_2$$

and of the compounds of Formula 4 above are $$Al\text{—}Cl_3, R\text{—Al—}Cl_2 \text{ and } R_2\text{—Al—Cl}$$

It will be seen that certain combinations of a compound of Formula 3, such as $R_2$—Al—Cl, and a different compound of Formula 4, such as R—Al—$Cl_2$, in equal molar proportions, form on admixture an alkyl aluminum sesquichloride of Formula 2, in which case the two compounds form the sesquichloride on admixture one with the other and without any needed interaction. On the other hand, the simplest compound of Formula 3, viz: $R_3$—Al, and simplest compound of Formula 4, viz: Al—$Cl_3$, when admixed in inert circumambient fluid media, as in an inert hydrocarbon solvent under a blanket of nitrogen gas, readily react with the evolution of heat and gas, indicating an exothermic reaction between the alkyl aluminum and the aluminum trichloride, which is known to be

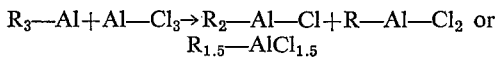

or an alkyl aluminum sesquichloride of the Formula 2 above.

It will be understood that other methods of making the mixed alkyl aluminum chlorides may be employed, as by reacting an alkyl chloride with metallic aluminum, in the presence of an appropriate catalyst, thus:

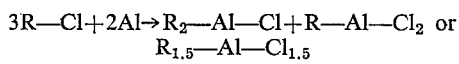

The alkyl aluminum sesquichloride may also be prepared by the reaction of triethyl aluminum and anhydrous aluminum trichloride in inert circumambient fluid media by a well-known reaction:

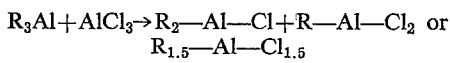

In the presence of titanium tetrachloride and diphenyl ether, the mixed alkyl aluminum chlorides are capable of taking up ethylene to grow into mixed alkyl aluminum chlorides hydrocarbon chains of increased chain length, as follows:

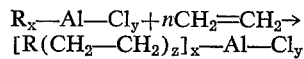

wherein R, $x$ and $y$ have the same significance as above, $n$ represents the number of ethylene molecules available for chain growth, and $z$ represents the mean number of ethylene molecules built into each of the $x$ hydrocarbon chains.

Various changes and modifications can be made without departing from the spirit of this invention or the scope thereof as defined in the following claims.

We claim:

1. A process comprising telomerizing ethylene with a catalyst comprising a complex of alkyl aluminum sesquichloride and diphenyl ether together with titanium tetrachloride or titanium trichloride at a temperature between 40 and 150° C., a pressure between 0 and 1000 p.s.i.g., the molar ratio of Ti:Al being about 1/10 to 1/800.

2. The process of claim 1 including the step of transalkylating the hydrocarbon telomer formed with ethylene.

3. The process of claim 1 including the step of hydrolyzing the telomer formed.

4. The process of claim 1 including the steps of oxidizing and hydrolyzing the telomer formed.

5. The process of claim 1 wherein titanium tetrachloride is used.

6. The process of claim 1 wherein titanium trichloride is used.

7. The process of claim 1 wherein said alkyl aluminum sesquichloride is ethylaluminum sesquichloride.

References Cited
UNITED STATES PATENTS

| | | | |
|---|---|---|---|
| 3,108,145 | 10/1963 | Antonsen | 260—683.15 |
| 3,179,677 | 4/1965 | Walde et al. | 260—683.15X |
| 3,349,149 | 10/1967 | McNulty et al. | 260—683.15 |
| 3,461,184 | 8/1969 | Hay et al. | 260—683.15 |

OTHER REFERENCES

Antonsen et al., I. & E. C. Product Research and Development, vol. 2, No. 3 (September 1963), pages 224–228.

PAUL M. COUGHLAN, JR., Primary Examiner

U.S. Cl. X.R.

260—448, 632, 676